(12) United States Patent
Stiller

(10) Patent No.: US 12,227,417 B2
(45) Date of Patent: Feb. 18, 2025

(54) PROCESS FOR PURE CARBON PRODUCTION

(71) Applicant: West Virginia University Research Corporation, Morgantown, WV (US)

(72) Inventor: Alfred H. Stiller, Morgantown, WV (US)

(73) Assignee: West Virginia University Board of Governors on Behalf of West Virginia University, Morgantown, WV (US)

( * ) Notice: Subject to any disclaimer, the term of this patent is extended or adjusted under 35 U.S.C. 154(b) by 684 days.

(21) Appl. No.: 16/915,205

(22) Filed: Jun. 29, 2020

(65) Prior Publication Data

US 2020/0325022 A1   Oct. 15, 2020

Related U.S. Application Data

(63) Continuation of application No. 16/140,060, filed on Sep. 24, 2018, now Pat. No. 10,696,555, which is a continuation of application No. 15/618,802, filed on Jun. 9, 2017, now Pat. No. 10,144,648, which is a continuation of application No. 14/213,533, filed on Mar. 14, 2014, now Pat. No. 9,701,539.

(60) Provisional application No. 61/798,198, filed on Mar. 15, 2013.

(51) Int. Cl.
| | | |
|---|---|---|
| *C01B 32/05* | (2017.01) | |
| *B01J 19/24* | (2006.01) | |
| *C01B 32/184* | (2017.01) | |
| *C01B 32/25* | (2017.01) | |
| *C01B 32/26* | (2017.01) | |
| *C01B 32/36* | (2017.01) | |
| *C01B 32/914* | (2017.01) | |
| *C01B 32/942* | (2017.01) | |
| *C01F 7/58* | (2006.01) | |
| *C01F 11/28* | (2006.01) | |

(52) U.S. Cl.
CPC ............... *C01B 32/05* (2017.08); *B01J 19/24* (2013.01); *C01B 32/184* (2017.08); *C01B 32/25* (2017.08); *C01B 32/26* (2017.08); *C01B 32/36* (2017.08); *C01B 32/914* (2017.08); *C01B 32/942* (2017.08); *C01F 7/58* (2013.01); *C01F 11/28* (2013.01)

(58) Field of Classification Search
None
See application file for complete search history.

(56) References Cited

U.S. PATENT DOCUMENTS 4,275,050 A * 6/1981 French .................... C01B 32/05
    423/466
11,332,833 B2 * 5/2022 Rutt ....................... C01B 32/914

OTHER PUBLICATIONS

DE1667532 Google translation; Jun. 18, 2022.*

* cited by examiner

*Primary Examiner* — Guinever S Gregorio

(57) ABSTRACT

The disclosure provides for methods of oxidizing carbide anions, or negative ions, from salt like carbides at low temperatures below about 600° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

19 Claims, No Drawings

PROCESS FOR PURE CARBON PRODUCTION

CROSS REFERENCE TO RELATED APPLICATIONS

This application is a continuation-in-part of U.S. application Ser. No. 16/140,060, filed Sep. 24, 2018, which is a continuation of U.S. application Ser. No. 15/618,802, filed Jun. 9, 2017, which is a continuation of U.S. application Ser. No. 14/213,533, filed Mar. 14, 2014, which claims priority to U.S. Provisional Application No. 61/798,198, filed Mar. 15, 2013, all of which are incorporated herein by reference in their entireties.

FIELD

The disclosure provides for methods of oxidizing carbide anions, or negative ions, from salt like carbides at low temperatures below about 600° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

BACKGROUND

Carbides are chemical compounds containing carbon and an element with lower electronegativity, or less of an ability to attract electrons. Nearly all elements react with elemental carbon to produce carbides. They are further classified into four groups: salt-like carbides, covalent carbides, interstitial carbides, and intermediate transition metal carbides. Salt-like carbides react with water and dilute acids to produce metallic cations and hydrocarbon gases. Intermediate transition metal carbides also react with dilute acid and sometimes water to produce hydrocarbons, metallic cations and sometimes hydrogen.

The salt-like carbides are further broken down into methanides, acetylides, and sesquicarbides. Methanides react with water to produce methane. Methane includes a carbon atom bonded to four hydrogen atoms in an sp3 hybridization. Two examples of these methanides are aluminum carbide ($Al_4C_3$) and beryllium carbide ($Be_2C$). Acetylides are salts of the acetylide anion $C_2^{2-}$ and also have a triple bond between the two carbon atoms. Triple bonded carbon has an sp1 hybridization and two examples of acetylides are sodium carbide ($Na_2C_2$) and calcium carbide ($CaC_2$). Sesquicarbides contain the polyatomic ion $C_3^{4-}$ and contains carbon atoms with an sp1 hybridization. Two examples of sesquicarbides are magnesium ($Mg_2C_3$) and lithium ($Li_4C_3$).

In 1919, patents were filed that defined an oxidization reaction to produce potassium metal by reacting potassium cations (positive ions) with acetylide anions from calcium carbide. The reacting medium was molten potassium fluoride. This is shown in the reaction in Equation (1) below:

Equation 1

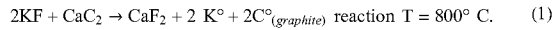

$$2KF + CaC_2 \rightarrow CaF_2 + 2\ K° + 2C°_{(graphite)} \text{ reaction T} = 800° \text{ C.} \quad (1)$$

The other products of that reaction are calcium fluoride and graphite. Graphite is the most thermodynamically stable form of elemental carbon, and this is therefore the favored product at high temperature. This reaction, the reduction of the potassium ion, takes place at about 800° C. which would be considered high temperature since 600° C. is red heat.

SUMMARY

The disclosure provides for a method of oxidizing carbide anions and/or negative ions from carbides by oxidizing carbide anions at a reaction temperature of below 600° C., wherein the reaction produces an allotrope of carbon in an sp1 and/or sp3 configuration.

In another aspect, the disclosure provides for a method of producing pure elemental allotropes of carbon by oxidizing salt-like carbide anions and/or intermediate carbide anions at a reaction temperature of below 600° C.

In yet another aspect, the disclosure provides for a method of producing diamonds by reacting carbides with molten metallic halide salts at temperatures below 600° C.

The disclosure also provides for a method of controlling a carbon allotrope by controlling the reduction potential of a low melting point halide salt reactant by varying the reduction potential of cations and/or changing the temperature of the melt.

In an aspect, the carbide anions are salt-like or intermediate carbide anions. In another aspect, the salt-like carbide anions are selected from the group consisting of methanides, acetylides, and sesquicarbides. In another aspect, the salt-like carbide anion is calcium carbide.

In an aspect, the methods described herein produce an allotrope of carbon in an sp1 configuration. In yet another aspect, the methods described herein produce an allotrope of carbon in an sp3 configuration.

The method disclosure also provides for methods described herein wherein the reaction temperature is below 300° C. and methods described herein further including adding a salt with a melting point of less than 250° C. as a reactant.

DETAILED DESCRIPTION

In an aspect, the disclosure provides for methods of oxidizing carbide anions, or negative ions, from salt like carbides at low temperatures below about 600° C. Oxidization means that the ion being oxidized gives up electrons. The negative ions of the salt like carbides are reacted to produce elemental carbon in its various allotropes, or crystal structures, with sp1, sp2, and/or sp3 hybridizations. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

The methodology described herein can be distinguished from previous reactions patented in 1919 for several reasons. For one, the reaction in equation (1) occurs at high temperatures of around 800° C. in previously known reaction mechanisms whereas the methodology described herein includes reactions at lower temperatures below around 600° C. Second, the reaction in equation (1) only produces graphite as a pure carbon product. Graphite is a crystalline allotrope of carbon with an sp2 hybridization. Until now, it was not recognized that such a reaction provides for a diamond with an sp3 hybridization, superconducting material with an sp1 hybridization, fullerenes, carbon nano tubes, or any of other forms of pure carbon. To this end, the disclosure differentiates from what was previously recognized in the art.

In an aspect, the first step of the reaction system is to oxidize the carbide ions at low temperature below 600° C., but typically the reactions occur below 300° C. The reactions use low melting point salts, for example stannous chloride ($SnCl_2$), that have melting points less than 280° C. as the reactants. The reaction medium is the molten salt, for example, molten stannous chloride. This means that there is an excess of salt during the reaction which takes place in the molten salt liquid. Chemically, the cation (positive ion) of the salt is reduced to the elemental state. Therefore, stannous ion $Sn^{+2}$ would become elemental tin ($Sn°$). The standard reduction potential of the stannous ion $Sn^{+2}$ is only about −0.136V. Reduction potential refers to the ability of a chemical species to acquire electrons and thus have its charge reduced. So not much energy is required to reduce the stannous ion, therefore the reaction reacts to completion. There is an excess of reduction potential in the carbide anions since they are shown to reduce the potassium ion in Equation (1) which requires −2.94V.

The reduction of $Sn^{+2}$ by acetylide or any carbide anion is not mentioned anywhere in the literature. Only certain metallic salts are applicable for this reaction. It is preferred that the cation of the salt does not produce a carbide by direct reaction with carbon at low temperatures or the temperature of the reduction reaction. If the cation does produce carbide, then pure carbon would not be produced. Examples of the preferred salts contain tin, lead, mercury, and zinc. Furthermore, the salts must have a low melting point. The temperature of the reaction must be high enough to melt the salts but low enough to control the electronic hybridization of the carbon. As mentioned in the background information, graphite is the most thermodynamically stable form of pure carbon. So if the temperature of the reaction is too high, the pure carbon will form crystalline graphite in the sp2 hybridization instead of the desired sp1 or sp3 hybridizations.

The next item in the reaction system is the low temperature oxidation of methanides to produce diamond, or carbon in that has an sp3 hybridization. Aluminum carbide ($Al_4C_3$) and beryllium carbide ($Be_2C$) are the only two known salt like carbides that produce methane when they react with water. The methane molecule contains a carbon atom in the sp3 hybridized state, which is the same as diamond. The idea is to oxidize the methanide anion in a controlled manner at temperatures low enough to maintain the electronic configuration, or sp3 hybridization and produce diamond. Thus, the controlled oxidization of aluminum carbide at low enough temperatures will preferentially produce diamonds. This reduction takes place at about 280° C. and atmospheric pressure.

Oxidation of the methanide (aluminum carbide) anion in molten tin halide salt blends to produce diamond. There is no literature that mentions the reduction of aluminum carbide much less anything that mentions this reaction to produce diamond, or sp3 hybridized carbon. Experiments for this reaction have been carried out using stannous fluoride ($SnF_2$) and stannous chloride ($SnCl_2$), which have melting points of 214° C. and 235° C., respectively. These reactions can be seen in Equation (2) and Equation (3) below:

Equation 2

$$Al_4C_3 + 6SnF_2 \rightarrow 6Sn° + 4AlF_3 + 3C°_{(diamond)} \text{ reaction T} = 235° C. \quad (2)$$

Equation 3

$$Al_4C_3 + 6SnCl_2 \rightarrow 6Sn° + 4AlCl_3 + 3C°_{(diamond)} \text{ reaction T} = 280° C. \quad (3)$$

The proof of the diamond, or carbon with sp3 hybridization, material produced was established using X-Ray Diffraction patterns (XRD) both at WVU and independently at Wright Patterson Air Force Base. Early diamond production studied certain metallic catalysts needed to make diamonds. These catalysts gave similar XRD patterns to diamonds which caused some confusion. However, no metallic catalysts or catalysts of any kind were used in this system of reactions. The fact that diamonds were produced was unexpected and provides support for the experiments described herein.

Since the chemical hypothesis to maintain the sp3 hybridization of pure carbon is confirmed with the production of diamonds, it can extended to include the potential superconducting material to maintain the sp1 hybridization of pure carbon. From the literature, there have been many different attempts to make this material but none have been successful. The process begins with a carbide that contains carbon in an sp1 hybridized state. As mentioned in the background information, acetylides have the ability to satisfy this requirement. The most common example is calcium carbide ($CaC_2$). However, sp1 carbon in the acetylide anion can be reconfigured even at very low energy or low temperatures. A more desired reactant is one that has a tendency to maintain the sp1 configuration throughout the rigors of the reaction. The disclosure provides for two compounds that have the ability to act as a sufficient reactant: magnesium sesquicarbide ($Mg_2C_3$) and lithium sesquicarbide ($Li_4C_3$), also mentioned in the background information. From the literature, a structural analysis using X-Ray diffraction was completed and shows that two of the carbon atoms are equivalent with an sp1 configuration. With a hydrolysis reaction, methyl acetylene ($CH_3C_2H$) is produced. One terminal carbon, the methyl carbon ($CH_3$) end is sp3 in nature while the other two carbons maintain their sp1 character. The goal is to polymerize the carbon atoms while maintaining the sp1 configuration. This would produce a completely new allotrope of carbon that has an sp1 configuration. Due to the electronic properties of such a material, it may be a high temperature superconductor. Based on the literature, this approach has never been attempted.

EXAMPLES

Example 1

In an oxygen moisture free environment, aluminum carbide, $Al_4C_3$ was ground to less than 20 mesh. A quantity of anhydrous stannous chloride, $SnCl_2$ was blended with the ground aluminum carbide at twice the stoichiometric ratio for the reaction below $$Al_4C_3 + 6SnCl_2 \longrightarrow 4AlCl_3 + 6Sn + 3C$$

The blend was poured into a glass ampoule that was subsequently placed into a stainless steel tube. The stainless steel tube was sealed and removed from the controlled environment. The tube and its contents were heated to 280° C. for 2 hours. The contents of the ampoule were washed with 6M HCl to remove all the aluminum chloride, excess stannous chloride and Sn metal. The remaining carbon was in two forms (1) a graphene like compressed set of platelets and (2) a cubic/orthorhombic diamond like structure. The preponderance of the carbon product was the latter structure.

Example 2

In an oxygen moisture free environment, calcium carbide, $CaC_2$ was ground to less than 20 mesh. A quantity of anhydrous zinc chloride, $ZnCl_2$ was blended with the ground aluminum carbide at twice the stoichiometric ratio for the reaction below

$$3CaC_2 + 3ZnCl_2 \longrightarrow 3CaCl_2 + 3Zn + 6C$$

The blend was poured into a glass ampoule that was subsequently placed in a stainless steel tube. The stainless steel tube was sealed and removed from the controlled environment. The tube and its contents were heated to 425° C. for 2 hours. The contents of the ampoule were washed with 6M HCl to remove all the Zinc chloride, calcium chloride, and Zn metal. The remaining carbon was in two forms (1) a graphene like compressed set of platelets and (2) a cubic/orthorhombic diamond like structure. The preponderance of the carbon product was the latter structure.

Example 3

In an oxygen moisture free environment, calcium carbide, $CaC_2$ was ground to less than 20 mesh. A quantity of anhydrous stannous chloride, $SnCl_2$ was blended with the ground aluminum carbide at twice the stoichiometric ratio for the reaction below

$$3CaC_2 + 3SnCl_2 \longrightarrow 3CaCl_2 + 3Sn + 6C$$

The blend was poured into a glass ampoule that was subsequently placed in a stainless steel tube. The stainless steel tube was sealed and removed from the controlled environment. The tube and its contents were heated to 280° C. for 2 hours. The contents of the ampoule were washed with 6M HCl to remove all the stannous chloride, calcium chloride, and Sn metal. The remaining carbon was in only one form a graphene like compressed set of platelets

What is claimed is:

1. A method comprising:
   reacting a carbide chemical compound with a metal salt at a reaction temperature of below 600° C. to form reaction products comprising carbon and elemental metal,
   wherein the reaction comprises an oxidation of the carbide chemical compound and a reduction of the metal salt and
   wherein a hybridization type of the carbon is controlled by changing a species of a cation of the metal salt, by changing the reaction temperature, and/or by changing a species of the metal salt and thereby changing a melting temperature of the metal salt.

2. The method of claim 1, wherein the reaction temperature is 425° C. or below.

3. The method of claim 1, wherein the metal salt is an anhydrous metal salt.

4. The method of claim 1, wherein the metal salt is a tin, zinc, lead, and/or mercury metal salt.

5. The method of claim 1, wherein the metal salt is used in excess with respect to the carbide chemical compound.

6. The method of claim 1, wherein the metal salt has a melting point of less than 280° C.

7. The method of claim 1, wherein the reaction is carried out in a molten salt reaction medium.

8. The method of claim 1, wherein the reaction is carried out in a reactor sealed at atmospheric pressure and heated after sealing.

9. The method of claim 1, wherein the reaction is carried out in an oxygen free and moisture free environment.

10. The method of claim 1, wherein the reaction is carried out free of catalyst.

11. The method of claim 1, wherein the carbide chemical compound is a salt-like or an intermediate carbide chemical compound.

12. The method of claim 1, wherein the carbide chemical compound is an acetylide compound, a methanide compound, or a sesquicarbide compound.

13. The method of claim 1, wherein the carbide chemical compound is calcium carbide, aluminum carbide, beryllium carbide, magnesium sesquicarbide, or lithium sesquicarbide.

14. The method of claim 1, wherein the reaction product comprises one form of carbon which includes graphene like platelets.

15. The method of claim 1, wherein the metal salt is a molten metallic halide salt and the reaction product includes diamond.

16. The method of claim 1, wherein the reaction product comprises at least two forms of carbon, wherein one form includes graphene like platelets and another form includes a diamond like structure.

17. The method of claim 1, wherein the reaction product comprises an allotrope of carbon in an sp2 or sp3 hybridization.

18. The method of claim 1, wherein the reaction product is diamond.

19. The method of claim 1, wherein the reaction temperature is high enough to melt the metal salt but low enough to control a hybridization of the reaction product, wherein the hybridization is an sp1, an sp3, or an sp3 hybridization.

* * * * *